(12) United States Patent
Wang (10) Patent No.: US 10,749,666 B2
(45) Date of Patent: Aug. 18, 2020

(54) DATA STATISTICS METHOD AND APPARATUS

(71) Applicant: ALIBABA GROUP HOLDING LIMITED, Grand Cayman (KY)

(72) Inventor: Huazhong Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/806,525

(22) Filed: Mar. 2, 2020

(65) Prior Publication Data

US 2020/0204342 A1   Jun. 25, 2020

Related U.S. Application Data

(63) Continuation of application No. PCT/CN2018/105288, filed on Sep. 12, 2018.

(30) Foreign Application Priority Data

Oct. 31, 2017   (CN) .......................... 2017 1 1046646

(51) Int. Cl.
*H04L 9/00* (2006.01)
*G06F 21/60* (2013.01)
(Continued)

(52) U.S. Cl.
CPC .............. *H04L 9/008* (2013.01); *G06F 17/18* (2013.01); *G06F 21/602* (2013.01); *H04L 9/30* (2013.01)

(58) Field of Classification Search
CPC .................................. H04L 9/008; H04L 9/30
(Continued)

(56) References Cited

U.S. PATENT DOCUMENTS

| 7,032,816 B2 | 4/2006 | Markham et al. |
| 7,191,183 B1 | 3/2007 | Goldstein |

(Continued)

FOREIGN PATENT DOCUMENTS

| CA | 2424487 C | 4/2002 |
| CN | 102694644 A | 9/2012 |

(Continued)

OTHER PUBLICATIONS

First Search for Taiwanese Application No. 107130568, dated Jun. 18, 2019, 1 page.
(Continued)

*Primary Examiner* — Longbit Chai
(74) *Attorney, Agent, or Firm* — Sheppard Mullin Richter & Hampton LLP (57) ABSTRACT

A data statistics method and an apparatus thereof, the method comprises: receiving, by a first processor of the cooperative data party, data identifiers corresponding to pieces of first data for the data statistics and corresponding encrypted data from the statistical data party; determining, by the first processor, an identifier intersection according to data identifiers corresponding to pieces of second data of the cooperative data party and the received data identifiers corresponding to the pieces of first data; performing, by the first processor, statistical processing on encrypted data corresponding to common data identifiers in the identifier intersection to obtain encrypted statistical values; and sending, by the first processor, the encrypted statistical values to a second processor of the statistical data party to enable the second processor to perform decryption on the encrypted statistical values and obtain the statistical values.

20 Claims, 4 Drawing Sheets

(51) Int. Cl.
*H04L 9/30* (2006.01)
*G06F 17/18* (2006.01)

(58) Field of Classification Search
USPC ........................................................ 713/168
See application file for complete search history.

(56) References Cited

U.S. PATENT DOCUMENTS

| | | | |
|---|---|---|---|
| 7,302,420 | B2 | 11/2007 | Aggarwal et al. |
| 8,438,045 | B2 | 5/2013 | Erlanger |
| 8,458,074 | B2 | 6/2013 | Showalter |
| 8,560,935 | B2 | 10/2013 | Jaffe et al. |
| 8,688,504 | B2 | 1/2014 | Reisman |
| 8,909,771 | B2 | 12/2014 | Heath |
| 9,288,039 | B1 | 3/2016 | Monet et al. |
| 9,369,589 | B2 | 6/2016 | Zalmanovitch et al. |
| 9,558,220 | B2 | 1/2017 | Nixon et al. |
| 9,998,485 | B2 | 6/2018 | Cohen et al. |
| 10,096,033 | B2 | 10/2018 | Heath |
| 10,129,211 | B2 | 11/2018 | Heath |
| 10,263,899 | B2 | 4/2019 | Bott |
| 10,496,654 | B2 | 12/2019 | Feng et al. |
| 2011/0016056 | A1 | 1/2011 | Hargroder |
| 2011/0060901 | A1* | 3/2011 | Troncoso Pastoriza ............... H04L 9/008 713/150 |
| 2012/0035429 | A1 | 2/2012 | Ebert et al. |
| 2012/0121080 | A1 | 5/2012 | Kerschbaum |
| 2014/0012862 | A1 | 1/2014 | Kawamoto et al. |
| 2014/0089062 | A1 | 3/2014 | Chen |
| 2014/0236515 | A1* | 8/2014 | Ho .................... G06Q 10/04 702/84 |
| 2015/0381349 | A1 | 12/2015 | Nikolaenko et al. |
| 2016/0323102 | A1 | 11/2016 | Freudiger et al. |
| 2016/0359617 | A1 | 12/2016 | Patel et al. |
| 2017/0277903 | A1 | 9/2017 | Christodorescu et al. |

FOREIGN PATENT DOCUMENTS

| | | |
|---|---|---|
| CN | 102722931 A | 10/2012 |
| CN | 102970143 A | 3/2013 |
| CN | 103281377 A | 9/2013 |
| CN | 103530305 A | 1/2014 |
| CN | 103678665 B | 3/2014 |
| CN | 104765848 A | 7/2015 |
| CN | 105590066 A | 5/2016 |
| CN | 106096431 A | 11/2016 |
| CN | 106209761 A | 12/2016 |
| CN | 106330865 A | 1/2017 |
| CN | 106603549 A | 4/2017 |
| CN | 106650205 A | 5/2017 |
| CN | 106856480 A | 6/2017 |
| CN | 107113162 A | 8/2017 |
| CN | 107291764 A | 10/2017 |
| TW | 201448550 | 12/2014 |
| TW | 201737059 A | 10/2017 |

OTHER PUBLICATIONS

First Search for Chinese Application No. 201711046646.3, dated Dec. 31, 2019, 1 page.

First Office Action for Chinese Application No. 201711046646.3, dated Jan. 8, 2020, 11 pages.

International Search Report and Written Opinion of the International Searching Authority for International Application No. PCT/CN2018/105288, dated Dec. 14, 2018, with partial machine English translation, 8 pages.

* cited by examiner

DATA STATISTICS METHOD AND APPARATUS

CROSS-REFERENCE TO RELATED APPLICATIONS

This patent application is a continuation of International Patent Application No. PCT/CN2018/105288, filed on Sep. 12, 2018, and entitled "DATA STATISTICS METHOD AND APPARATUS", which is based on and claims priority to and benefit of Chinese Patent Application No. 201711046646.3, filed with China National Intellectual Property Administration (CNIPA) of People's Republic of China on Oct. 31, 2017, and entitled "DATA STATISTICS METHOD AND APPARATUS". The entire disclosures of all of the above-identified applications are incorporated herein by reference.

TECHNICAL FIELD

The present specification relates to the network technology field, and more particularly to a data statistics method and apparatuses thereof.

BACKGROUND ART

A great number of data islands may exist in the big data era. For example, the data of a person can be dispersedly stored with different enterprises. However, there may be no complete mutual trust among the enterprises due to competitive relationships and concerns of the user privacy protection, which may create a barrier for cooperation of data statistics among the enterprises. There is an urgent need for a solution on how to achieve some data statistics calculations using the data owned by different parties without leaking data privacy of the respective enterprises, to ensure that the privacy of the core data of the respective enterprises is fully protected. However, no good solution is available so far.

SUMMARY OF THE INVENTION

For the reasons discussed above, the present specification provides a data statistics method and apparatuses thereof for implementing secure calculations between two parties/data owners while protecting privacy of the data of the two or more data owners.

Specifically, one or more embodiments of the present specification may be implemented by the following technical solutions.

In a first aspect of the present specification, a data statistics method may be provided. The method may be applied to a data statistics by combining data of a statistical data party and a cooperative data party. The statistical data party comprises a plurality of pieces of first data whose statistical values to be calculated, and the plurality of pieces of first data respectively corresponds to data identifiers. The cooperative data party comprises a plurality of pieces of second data corresponding to the data identifiers. The method may further comprise: receiving, by a first processor of the cooperative data party, data identifiers corresponding to pieces of first data for the data statistics and corresponding encrypted data from the statistical data party; determining, by the first processor, an identifier intersection according to data identifiers corresponding to pieces of second data of the cooperative data party and the received data identifiers corresponding to the pieces of first data; performing, by the first processor, statistical processing on encrypted data corresponding to common data identifiers in the identifier intersection to obtain encrypted statistical values; and sending, by the first processor, the encrypted statistical values to a second processor of the statistical data party to enable the second processor to perform decryption on the encrypted statistical values and obtain the statistical values.

The data statistics method may further comprise receiving first processing identifiers from the statistical data party by the first processor. The method further comprises: after the receiving the first processing identifiers from the statistical data party, the operations performed by the first processor including: generating counterpart private keys according to a key exchange protocol; generating first key processing identifiers by performing counterpart private key processing on the first processing identifiers using the counterpart private keys; and storing correlations between the first key processing identifiers and encrypted data thereof.

The data statistics method may further comprise: by the first processor, performing the counterpart private key processing on the data identifiers respectively corresponding to the pieces of second data for the data statistics using the counterpart private keys to obtain second processing identifiers, and sending the second processing identifiers to the statistical data party; receiving second key processing identifiers returned by the statistical data party; and determining the identifier intersection between the first key processing identifiers and the second key processing identifiers.

The data statistics method may further comprise: when the statistical values comprise sums of the plurality of pieces of first data, the performing, by the first processor, statistical processing on encrypted data and to obtain encrypted statistical values comprises performing a summation statistical calculation on the encrypted data; and when the statistical values comprise average values of the plurality of pieces of first data, the performing, by the first processor, statistical processing on encrypted data to obtain encrypted statistical values comprises performing an average value calculation on the encrypted data.

The data statistics method may further comprise: by a second processor of the statistical data party, respectively performing homomorphic encryption on the pieces of first data for the data statistics to obtain the encrypted data; sending the data identifiers corresponding to the pieces of first data and the corresponding encrypted data to the cooperative data party; receiving the encrypted statistical values from the cooperative data party; and performing homomorphic decryption on the encrypted statistical values to obtain the statistical values. The encrypted statistical values may be encrypted with the homomorphic encryption.

The data statistics method may further comprise: by the second processor, generating private keys according to the key exchange protocol; performing private key processing on the data identifiers using the private keys to generate the first processing identifiers; sending the first processing identifiers to the cooperative data party; receiving the second processing identifiers from the cooperative data party; performing the private key processing on the received second processing identifiers to generate the second key processing identifiers; and sending the second key processing identifiers to the cooperative data party.

The data statistics method may further comprise: by the second processor, obtaining the pieces of first data for the data statistics according to predetermined data filtering conditions.

In a second aspect of the present specification, a data statistics apparatus may be provided. The apparatus may comprise a memory, at least one processor, and computer instructions stored in the memory and executed by the at least one processor, to cause the at least one processor to perform operations. The operations may comprise: receiving, by a first processor of a cooperative data party, data identifiers corresponding to pieces of first data for the data statistics and corresponding encrypted data from a statistical data party, wherein the at least one processor includes the first processor and a second processor of the statistical data party; determining, by the first processor, an identifier intersection according to data identifiers corresponding to pieces of second data of the cooperative data party and the received data identifiers corresponding to the pieces of first data; performing, by the first processor, statistical processing on encrypted data corresponding to common data identifiers in the identifier intersection to obtain encrypted statistical values; and sending, by the first processor, the encrypted statistical values to the second processor of the statistical data party to enable the second processor to perform decryption on the encrypted statistical values and obtain the statistical values.

In a third aspect of the present specification, a non-transitory computer-readable storage medium may be provided. The non-transitory computer-readable storage medium may comprise at least a computer instructions stored in a memory and executed by at least one processor, to cause the at least one processor to perform operations. The operations may comprise: receiving, by a first processor of a cooperative data party, data identifiers corresponding to pieces of first data for the data statistics and corresponding encrypted data from a statistical data party, wherein the at least one processor includes the first processor and a second processor of the statistical data party; determining, by the first processor, an identifier intersection according to data identifiers corresponding to pieces of second data of the cooperative data party and the received data identifiers corresponding to the pieces of first data; performing, by the first processor, statistical processing on encrypted data corresponding to common data identifiers in the identifier intersection to obtain encrypted statistical values; and sending, by the first processor, the encrypted statistical values to a second processor of the statistical data party to enable the second processor to perform decryption on the encrypted statistical values and obtain the statistical values.

In the data statistics method and apparatus thereof according to one or more embodiments of the present specification, a cooperative data party can perform statistical processing on encrypted data which is homomorphically encrypted and sent to the cooperative data party. The statistical processing results can be obtained as long as a local homomorphic decryption is performed. This method protects privacy security of the local data, enables the data processing of combined two data sources without exposing any data privacy, and implements secure calculations between two parties while protecting data privacy of two data owners.

BRIEF DESCRIPTION OF THE FIGURES

To clearly describe technical solutions in one or more embodiments of the present specification, figures to be used in the description of the embodiments or of prior art will be briefly introduced below. Obviously, the figures in the following description are only some of the embodiments of the present specification. A person having ordinary skill in art may also obtain other figures according to these figures without creative efforts.

DETAILED DESCRIPTION OF EMBODIMENTS

A clear and complete description of the technical solutions in one or more embodiments of the present specification is provided below in conjunction with the figures in one or more embodiments of the present specification so that a person of ordinary skill in the art can better understand the technical solutions in one or more embodiments of the present specification. Obviously, the embodiments described are only some, but not all, of the embodiments. All other embodiments obtained by a person of ordinary skill in the art based on one or more embodiments of the present specification without creative efforts also fall in the scope of protection of the present specification.

In the big data era, the data storage method may include a vertical mode, that is, a plurality of data owners may own different attribute information of a same entity. For example, a vehicle insurance score of a person exists in one organization while the claim amount of the same person exists in another organization. Such data storage in the vertical mode may cause involvement of a plurality of data owners in some data statistics calculations, and require a cooperation of the plurality of data owners to complete one data statistics. However, data confidentiality of respective enterprises cannot be betrayed due to the competition among different enterprises or the concern of privacy protection.

In the embodiments of the present specification, data statistics may be performed based on data of different data owners without disclosing data privacy of respective data owners. This method is elaborated below using, but not limited to, an exemplary application scenario.

Application Scenario

For example, the data statistics of the insurance score of the vehicle insurance may involve two data sources: a data source A and a data source B. The data source A is a data organization and the data source B is an insurance organization. Both data sources respectively store different information of the same vehicle owners.

Data source A stores the vehicle insurance score of every vehicle owner. A vehicle insurance score is a score obtained by performing accurate portraying and risk analysis on a vehicle owner. A higher vehicle insurance score indicates a lower risk. As shown in Table 1, the data structure of vehicle insurance scores stored in the data source A is as follows.

TABLE 1

Data structure of data source A

| Column Name | Type | Description | Example |
|---|---|---|---|
| idcard_no | string | ID card No. | ******197309119564 |
| score | int | Vehicle insurance score | 510 |

Data source B stores the claim information of every vehicle owner. For example, the claim information of a vehicle owner includes the number of claims, the claim amount, etc. As shown in Table 2, data structure of every vehicle owner stored in the data source B is as follows.

TABLE 2

Data structure of data source B

| Column Name | Type | Description | Example |
|---|---|---|---|
| idcard_no | string | ID card No. | ******197309119564 |
| gender | string | Gender | female |
| times | int | Number of claims in the recent one year | 3 |
| amount | int | Claim amount | 3,500 |

Based on the preceding application scenario, one data statistics can be jointly finished based on the data of the data source A and the data source B. For example, the required statistical task is "to perform statistical calculation of the sum of vehicle insurance scores on female users whose number of claims is greater than 5." In this requirement, "female users whose number of claims is greater than 5" indicates that data in the data source B can be used as a filtering condition for obtaining a statistical value, and "sum of vehicle insurance scores" indicates that the statistic calculation of summation of the data "score" in the data source A can be performed.

Based on the data structure as shown in Table 1, the vehicle insurance scores in the data source A is shown in the following Table 3, wherein "idcard_no" is a vehicle owner's ID card number, and "score" is the vehicle insurance score of this vehicle owner.

TABLE 3

Data of data source A

| idcard_no | score |
|---|---|
| 1234567 | 490 |
| 2345678 | 501 |
| 3456789 | 530 |

Based on the data structure as shown in Table 2, the data source B owns data as shown in the following Table 4.

TABLE 4

Data of data source B

| idcard_no | gender | number of claims | amount |
|---|---|---|---|
| 1234567 | Male | 3 | 5000 |
| 2345678 | Female | 7 | 23000 |
| 3456789 | Female | 6 | 16000 |

The statistical calculation of "sum of vehicle insurance scores of female users whose number of claims is greater than 5" may be performed based on the preceding Table 3 and Table 4. It can be seen that the statistical data of "vehicle insurance score" in this statistics is stored in the data source A. The "score" column in Table 3 is a "statistical column", that is, the statistical calculation of data in this column may be performed to sum vehicle insurance scores. "Number of claims" and "gender" in the filtering conditions are stored in the data source B. Therefore, the cooperation between the data source A and the data source B is required to finish the statistical calculation of summation of the vehicle insurance scores.

In the following description of the data statistics method, the data source A with the statistical data "vehicle insurance score" is called statistical data party, while the data source B is called cooperative data party. As mentioned above, both data sources respectively store different information of the same vehicle owners. The information of the vehicle owners stored in the data source A (e.g. score) is called first data. The information of the vehicle owner about parameter data statistics stored in the data source B (e.g. gender, number of claims in the recent one year, and claim amount) is called second data. The second data is used as filtering conditions during the statistical calculation. In addition, idcard_no included in both the data source A and data source B is called the data identifier, that is, the data source A stores the first data corresponding to this data identifier and the data source B stores the second data corresponding to the same data identifier.

Figure 1:
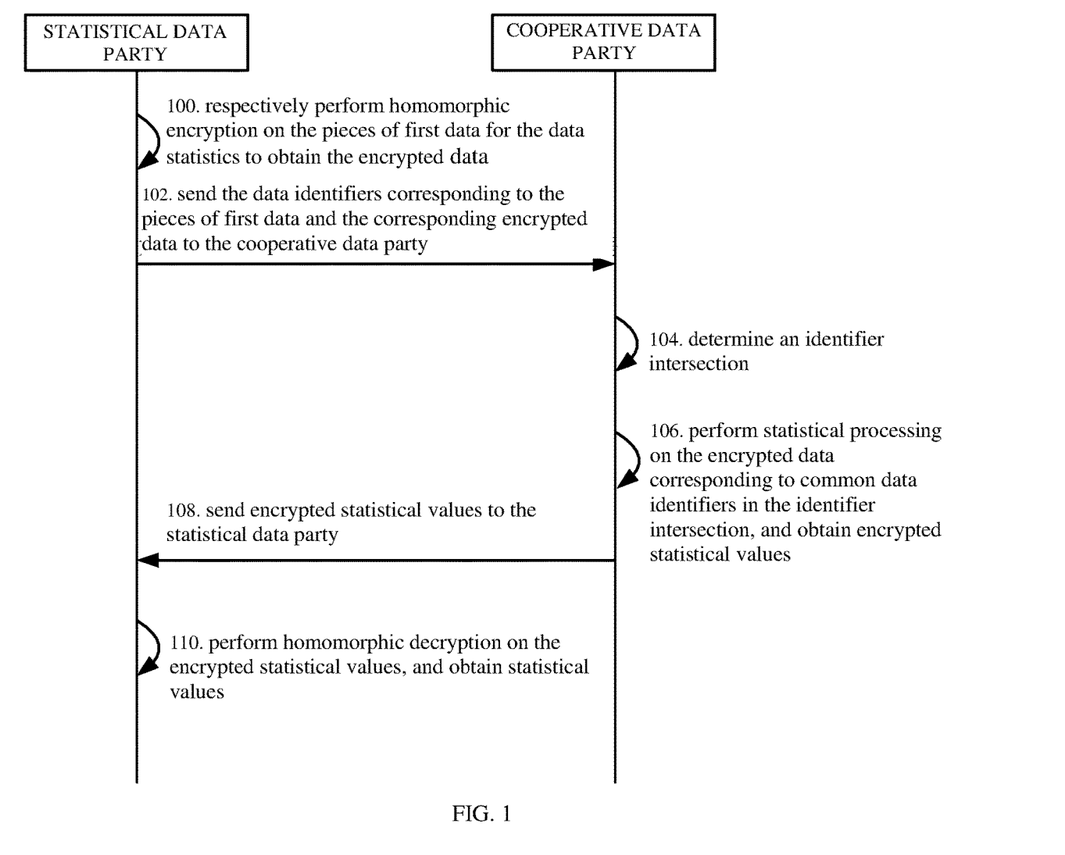
FIG. 1 is a flow chart of a data statistics method according to one or more embodiments of the present specification.

FIG. 1 shows an example of a process of a data statistics method. As shown in FIG. 1, the method comprises the following steps.

In Step 100, the statistical data party may respectively perform homomorphic encryption on a plurality of pieces of first data and obtain encrypted data.

The plurality of pieces of first data in this step may be the data of the statistical data party subject to the data statistics. The plurality of pieces of first data may be obtained according to the data filtering conditions of the statistical data party.

In Step 102, the statistical data party may send data identifiers (etc., first data identifiers) corresponding to the plurality of pieces of first data subject to the data statistics and the encrypted data thereof to a cooperative data party.

In Step 104, the cooperative data party determines an identifier intersection according to data identifiers (etc., second data identifiers) corresponding to a plurality of pieces of second data of the local data party subject to the data statistics and the first data identifiers of the plurality of pieces of first data subject to the data statistics.

In this step, the cooperative data party may obtain the plurality of pieces of second data subject to the data statistics according to local filtering conditions, and acquire the second data identifiers corresponding to the plurality of pieces of second data. The intersection between the second data identifiers and the first data identifiers received from the statistical data party in Step 102 is called the identifier intersection. The identifier intersection may include at least one data identifier (etc., one common data identifier). The first data corresponding to the common data identifiers in the identifier intersection is the data of the statistical data party participating in the data statistics. The second data corresponding to the common data identifiers in the identifier intersection is the data of the cooperative data party participating in the data statistics.

In Step 106, the cooperative data party may perform statistical processing on the encrypted data corresponding to the common data identifiers in the identifier intersection and obtain encrypted statistical values.

In this step, the cooperative data party may perform statistical calculations on the encrypted data corresponding to the common data identifiers in the identifier intersection. Specific types of the data statistics, such as summation or average, may depend on specific business requirements. In addition, the statistical processing may be performed on the encrypted data, but not on the original first data. This statistical method does not expose true data of the statistical data party, and allows the cooperative data party to freely perform the required data statistics satisfying its own data filtering conditions.

In Step 108, the cooperative data party sends the encrypted statistical values to the statistical data party.

In Step 110, the statistical data party performs homomorphic decryption on the encrypted statistical values and obtains statistical values.

In this step, according to the characteristics of the homomorphic encryption, the homomorphic decryption may be performed on the encrypted statistical values returned by the cooperative data party to obtain the statistical values that are the same as those obtained based on the original first data participated in the data statistics.

The data statistics method in this example, the homomorphic encryption may be applied to the calculation of combined data of two parties, so that the data received by the cooperative data party is the homomorphically encrypted data without exposing the true data of the statistical data party. In addition, when receiving the encrypted statistical values, the statistical data party can obtain the required data by performing the homomorphic decryption. This is very convenient and also protects data privacy of both data owners.

In another example, when data is transmitted between a local data party, such as a statistical data party, and a cooperative data party, the data identifiers may be encrypted according to a key exchange protocol to provide more secure protection for the data privacy of both data owners. For example, the statistical data party may perform local private key processing on the data identifiers using a local private key, and send the processed data identifiers to the counterpart party, such as the cooperative data party, so that the counterpart party can continue to perform counterpart private key processing on the processed data identifiers. The statistical data party also may receive data identifiers sent by the cooperative data party and processed by the counterpart private key processing, continue to perform the local private key processing on the processed data identifiers sent by the cooperative data party, and return them to the cooperative data party. The processing of the data identifiers by both parties according to the key exchange protocol avoids the exposure of the data identifiers and provides more secure protection.

Figure 2:
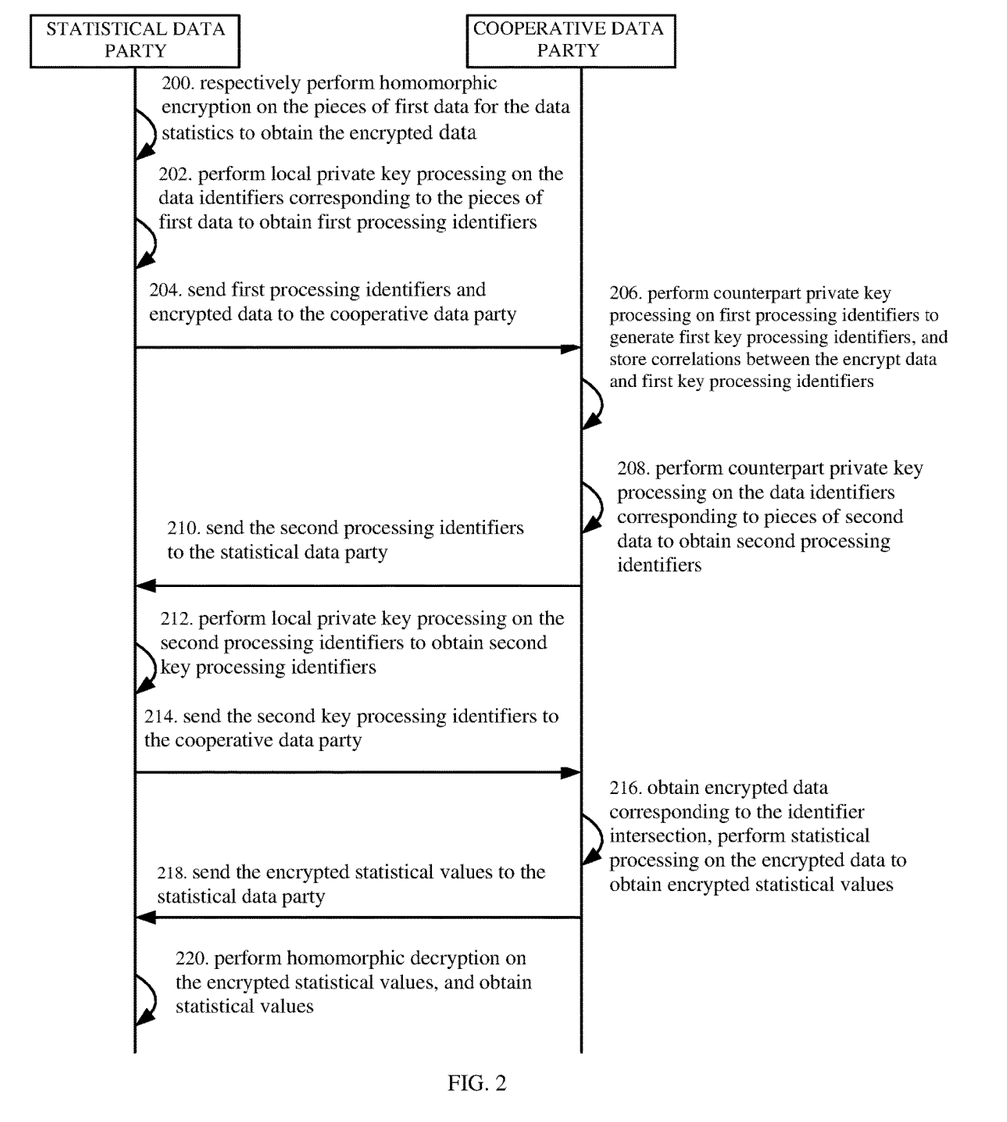
FIG. 2 is a flow chart of another data statistics method according to one or more embodiments of the present specification.

The FIG. 2 shows an embodiment of a process of a data statistics method. This process can perform statistical calculations of the sum of vehicle insurance scores of female users whose number of claims is greater than 5 based on Tables 3 and 4. In addition, as shown in FIG. 2, in an example of the combination of the homomorphic encryption process and key exchange process, the method of this embodiment may comprise following steps.

In Step 200, the statistical data party may perform the homomorphic encryption on the plurality of pieces of first data subject to the local data statistics, and obtain the encrypted data corresponding to the plurality of pieces of first data.

In this embodiment, the data source A is a statistical data party. The score column is called a statistical column, and every vehicle score is called a piece of the first data.

In one embodiment, the data source A may perform statistical calculations of the sum of all vehicle insurance scores in the score statistical column of the statistical Table 3, that is, the sum of three vehicle insurance scores including 490, 501, and 530. The three vehicle insurance scores including 490, 501, and 530, are called "three pieces of first data of local data statistics."

In another embodiment, the data source A can also select a part of vehicle insurance scores to participate in the summation statistical calculation according to the predetermined data filtering conditions. For example, the data source A may select two vehicle insurance scores including 501 and 530 to perform the summation, based on a predetermined data filtering condition of "the score is greater than 500."

In this step, assuming that there is no data filtering condition on the data source A, the encrypted data respectively corresponding to the plurality of pieces of first data may be obtained by performing the homomorphic encryption on all pieces of the first data in the statistical column. For example, the encrypted data of the vehicle insurance scores of 490 and 501 is expressed as Enc (490) and Enc (501), respectively.

In Step 202, the statistical data party may perform the local private key processing on the data identifiers respectively corresponding to the plurality of pieces of first data subject to the local data statistics according to the key exchange protocol, and obtain the plurality of first processing identifiers.

In this step, idcard_no corresponding to scores in Table 3 are called data identifiers corresponding to the plurality of pieces of first data. A key exchange protocol, such as Diffie-Hellman key exchange ("D-H" for short), may be used to process the data identifiers to prevent the exposure of the detailed data of the data source A and data source B.

For example, Hash may be performed on idcard_no to obtain H(K), wherein K is the idcard_no. At the same time, the data source A may generate its own local private key $\alpha$ in the key exchange protocol, and perform the local private key processing on the Hashed idcard_no using the generated local private key. This processing may include a exponent operations on H(k) to obtain $H(k)^\alpha$. This $H(k)^\alpha$ is called a first processing identifier.

For example, after performing the summation statistical calculation of all pieces of the first data in the statistical column of the data source A, the data source A may obtain the encrypted data corresponding to pieces of first data participating in the statistics and the first processing identifiers thereof. As shown in the following Table 5, $H(k)^\alpha$ (that is, Hash(idcard_no)$^\alpha$) is the first processing identifier and Enc (score) is the encrypted data thereof. For example, the vehicle insurance score for the first vehicle owner in Table 3 is 490, the corresponding encrypted data is Enc (490), and the data identifier corresponding to the vehicle insurance score of 490 is 1234567. The first processing identifier H(1234567)$^\alpha$ may be obtained by performing Hash and the local private key processing on this data identifier.

TABLE 5

First processing identifiers and encrypted data

| Hash(idcard_no)$^\alpha$ | Enc (score) |
|---|---|
| H(1234567)$^\alpha$ | Enc (490) |
| H(2345678)$^\alpha$ | Enc (501) |
| H(3456789)$^\alpha$ | Enc (530) |

In Step 204, the statistical data party may send the first processing identifiers respectively corresponding to the plurality of pieces of first data and the encrypted data thereof to the cooperative data party.

In this step, the data source A sends the data in Table 5 to the data source B.

In Step 206, the cooperative data party may perform counterpart private key processing on the first processing identifiers according to the key exchange protocol, generate first key processing identifiers, and store the correlations between the first key processing identifiers and the encrypted data.

In this step, after receiving the data in Table 5, the data source B may generate a counterpart private key β of the data source B according to the key exchange protocol, and perform the counterpart private key operations (that is, exponent operations) using this counterpart private key β on the first processing identifier H(k)$^\alpha$ to obtain H(k)$^{\alpha\beta}$. This H(k)$^{\alpha\beta}$ is called the first key processing identifier. After the β exponent operation of this step, Table 5 may be converted into Table 6 as follows.

TABLE 6

First key processing identifiers and encrypted data

| Hash(idcard_no)$^{\alpha\beta}$ | Enc (score) |
|---|---|
| H(1234567)$^{\alpha\beta}$ | Enc (490) |
| H(2345678)$^{\alpha\beta}$ | Enc (501) |
| H(3456789)$^{\alpha\beta}$ | Enc (530) |

In Step 208, the cooperative data party may perform the counterpart private key processing on the data identifiers respectively corresponding to the plurality of pieces of second data subject to the local data statistics according to the key exchange protocol, and obtain a plurality of second processing identifiers.

In this step, the data source B may also determine the plurality of pieces of second data subject to the local data statistics, which may include all pieces of the second data or the second data filtered according to local predetermined filtering conditions.

For example, the predetermined filtering condition is "female users whose number of claims is greater than 5". Data in Table 4 is filtered according to this local predetermined filtering condition, such that the last two rows of the data in Table 4 may participate in the data statistics. Gender and number of claims of the data source B in Table 4 are called the second data. For example, "female, 7" and "female, 6" are two pieces of second data, and may correspond to data identifiers of U.S. Pat. Nos. 2,345,678 and 3,456,789, respectively.

The data source B may respectively perform Hash on the preceding data identifiers corresponding to the second data to obtain H(K), and then perform the β exponent operations on H(k) according to the key exchange protocol to obtain H(k)$^\beta$. This β is the counterpart private key of the data source B. This H(k)$^\beta$ is called the second processing identifier, as shown in the Table 7 as follows.

TABLE 7

Second key processing identifiers
Hash(idcard_no)$^\beta$

| H(2345678) $^\beta$ |
|---|
| H(3456789) $^\beta$ |

In Step 210, the cooperative data party sends the second processing identifiers to the statistical data party.

In this step, the data source B sends the data in the Table 7 to the data source A.

In Step 212, the statistical data party may perform the local private key processing on the second processing identifiers, and generate the second key processing identifiers.

For example, after receiving the second processing identifier Hash(idcard_no)$^\beta$ in Table 7, the data source A generates a second key processing identifier Hash(idcard_no)$^{\beta\alpha}$ by performing the local private key processing of the data source A, as shown in the following Table 8.

TABLE 8

Second key processing identifiers
Hash(idcard_no)$^{\beta\alpha}$

| H(2345678) $^{\beta\alpha}$ |
|---|
| H(3456789) $^{\beta\alpha}$ |

In Step 214, the statistical data party may send the second key processing identifiers to the cooperative data party.

In Step 216, the cooperative data party may obtain various encrypted data corresponding to the identifier intersection between the first key processing identifiers and the second key processing identifiers, perform the statistical processing on the encrypted data corresponding to the identifier intersection, and obtain the encrypted statistical values.

In this step, the data source B may obtain an intersection between the second key processing identifiers in Table 8 and the first key processing identifiers in Table 6. Hash(idcard_no)$^{\beta\alpha}$ and Hash(idcard_no)$^{\alpha\beta}$ that have the same values may correspond to the same idcard_no, that is, a vehicle owner represented by the same idcard_no may satisfy the filtering conditions of the data of both the statistical data party and the cooperative data party participating in the data statistics. The encrypted data corresponding to the first key processing identifiers in the intersection may be obtained according to the intersection and the correlations between the first key processing identifiers and the encrypted data in Table 6. The intersection and the encrypted data corresponding to the intersection are as shown in Table 9.

TABLE 9

Identifier intersection and corresponding encrypted data

| Hash(idcard_no)$^{\alpha\beta}$ | Hash(idcard_no)$^{\beta\alpha}$ | Enc (score) |
|---|---|---|
| H(2345678)$^{\alpha\beta}$ | H(2345678)$^{\beta\alpha}$ | Enc (501) |
| H(3456789)$^{\alpha\beta}$ | H(3456789)$^{\beta\alpha}$ | Enc (530) |

According to Table 9, statistical summation of the encrypted data corresponding to identifiers in the identifier intersection can be performed, for example, Enc (501)+Enc (530). Values obtained are called the encrypted statistical values.

In Step 218, the cooperative data party may send the encrypted statistical values to the statistical data party.

For example, the data source B sends the encrypted statistical value "Enc (501)+Enc (530)" to the data source A.

In Step 220, the statistical data party may perform the homomorphic decryption on the encrypted statistical values and obtain the statistical values.

For example, when receiving the encrypted statistical value "Enc (501)+Enc (530)", the data source A performs the homomorphic decryption DEC (Enc (501)+Enc (530))= 1031. This 1031 is a statistical value of the sum of vehicle insurance scores of female users whose number of claims is greater than 5.

In the data statistics method according to this example, during the data statistics, homomorphically encrypted data may be sent to the cooperative data party, so that the cooperative data party can perform statistical processing on the encrypted data. The same results, such as statistical values, can be obtained by performing local homomorphic decryption at the local data party (i.e., the statistical data party). This method protects the privacy security of the local data, and process the combined data of the two data sources without exposing any data privacy. It also protects privacy security of all filtering fields by using a key exchange protocol.

In addition, the process shown in FIG. 2 takes an example of a statistical value being the sum of a plurality of pieces of first data. In other embodiments, the data statistics method according to the present specification may also be applied to other scenarios of the statistical calculations. For example, a statistical value may be an average value of a plurality of pieces of first data.

For example, an "average of vehicle insurance scores of female users whose number of claims is greater than 5" may be processed according to the process shown in FIG. 2. The difference from the previous example is that, when performing the statistical processing on the various encrypted data, the data source B may calculate an average of the various encrypted data. For example, an encrypted statistical value may be obtained by dividing the value of Enc (501)+Enc (530) by 2. After receiving the encrypted statistical value returned by the data source B, the data source A performs the homomorphic decryption on the received encrypted statistical values to obtain the average values.

Figure 3:
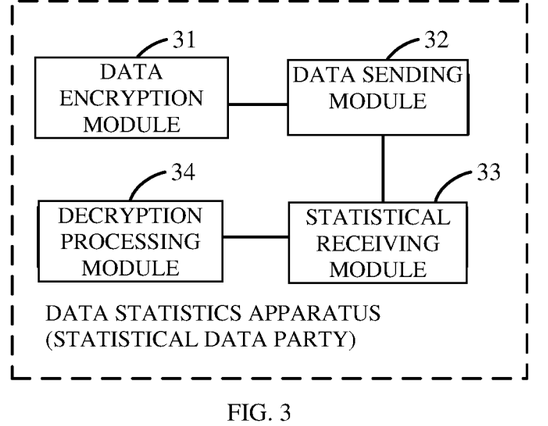
FIG. 3 is a block diagram of a data statistics apparatus according to one or more embodiments of the present specification.

To implement the method described above, one or more embodiments of the present specification also provide a data statistics apparatus for the data statistics between a local data party (i.e., a statistical data party) and a cooperative data party. The local data party has the plurality of pieces of first data corresponding to the data identifiers, and the cooperative data party has the plurality of pieces of second data corresponding to the same data identifiers. In addition, the apparatus may be configured to obtain the statistical values from the plurality of pieces of first data. As shown in FIG. 3, this apparatus may comprise a data encryption module 31, a data sending module 32, a statistical receiving module 33, and a decryption processing module 34.

The data encryption module 31 is configured to respectively perform the homomorphic encryption on the plurality of pieces of first data, and obtain the encrypted data.

The data sending module 32 is configured to send the data identifiers corresponding to the plurality of pieces of first data and the encrypted data thereof to the cooperative data party.

The statistical receiving module 33 is configured to receive the encrypted statistical values returned by the cooperative data party. The encrypted statistical values can be obtained by performing a statistical calculation on the encrypted data corresponding to the common data identifiers in an identifier intersection by the cooperative data party, wherein the identifier intersection includes the common data identifiers corresponding to pieces of second data of the cooperative data party subject to the data statistics and selected from the plurality of data identifiers corresponding to the plurality of pieces of first data.

The decryption processing module 34 is configured to perform the homomorphic decryption on the encrypted statistical values and obtain the statistical values.

Figure 4:
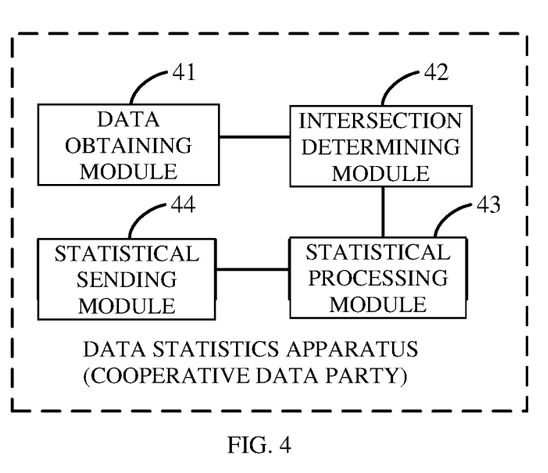
FIG. 4 is a block diagram of a data statistics apparatus according to one or more embodiments of the present specification.

To implement the method described above, one or more embodiments of the present specification also provide another data statistics apparatus for the data statistics between a local data party and a statistical data party. The statistical data party has a plurality of pieces of first data subject to calculations of statistical values and respectively corresponding to different data identifiers. The local data party has a plurality of pieces of second data corresponding to the same data identifiers. As shown in FIG. 4, this apparatus may comprise a data obtaining module 41, an intersection determining module 42, a statistical processing module 43, and a statistical sending module 44.

The data obtaining module 41 is configured to receive the data identifiers and the corresponding encrypted data from the statistical data party. The received data identifiers may include the identifiers corresponding the plurality of pieces of first data of the statistical data party subject to the data statistics, and the encrypted data can be obtained by performing the homomorphic encryption on the plurality of pieces of first data by the statistical data party.

The intersection determining module 42 is configured to determine the identifier intersection according to the data identifiers corresponding to the plurality of pieces of second data of the local data party participating in the data statistics and the data identifiers of the plurality of pieces of first data.

The statistical processing module 43 is configured to perform the statistical processing on the encrypted data corresponding to the common data identifiers in the identifier intersection, and obtain the encrypted statistical values.

The statistical sending module 44 is configured to send the encrypted statistical values to the statistical data party, so that the statistical data party can perform the homomorphic decryption on the encrypted statistical values and obtain the statistical values.

Figure 5:
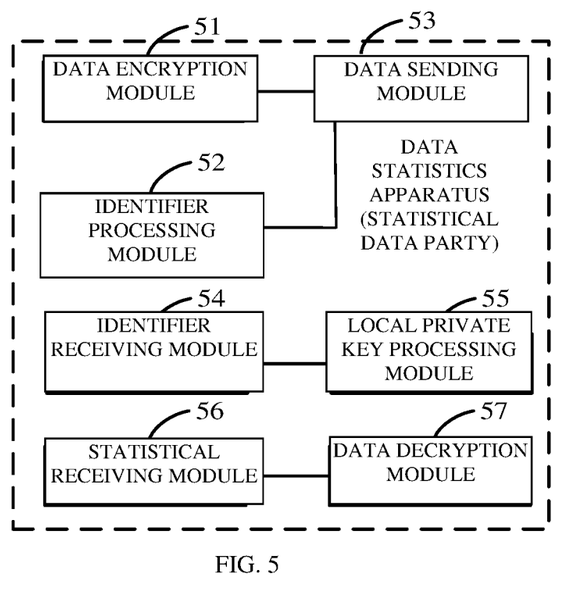
FIG. 5 is a block diagram of a data statistics apparatus according to one or more embodiments of the present specification.

To implement the method described above, one or more embodiments of the present specification also provide a data statistics apparatus as shown in FIG. 5. The apparatus may comprise a data encryption module 51, an identifier processing module 52, a data sending module 53, an identifier receiving module 54, a private key processing module 55, a statistical receiving module 56, and a data decryption module 57.

The data encryption module 51 is configured to perform the homomorphic encryption on a plurality of pieces of first data subject to the local data statistics, and obtain the encrypted data.

The identifier processing module 52 is configured to perform local private key processing on the data identifiers respectively corresponding to the plurality of pieces of first data according to a key exchange protocol, and obtain a plurality of first processing identifiers.

The data sending module 53 is configured to send the plurality of first processing identifiers and the encrypted data to the cooperative data party, so that the cooperative data party can perform counterpart private key processing on the first processing identifiers, generate the first key processing identifiers, and store the correlations between the first key processing identifiers and the encrypted data.

The identifier receiving module 54 is configured to receive second processing identifiers from the cooperative data party. The second processing identifiers can be obtained by performing the counterpart private key processing on the data identifiers of the plurality of pieces of second data subject to the data statistics by the cooperative data party.

The local private key processing module 55 is configured to perform the local private key process on the second processing identifiers, and generate and send second key processing identifiers to the cooperative data party.

The statistical receiving module 56 is configured to receive encrypted statistical values from the cooperative data party. The encrypted statistical values can be obtained by performing the statistical processing on the various encrypted data corresponding to the identifier intersection between the first key processing identifiers and second key processing identifiers by the cooperative data party.

The data decryption module 57 is configured to perform the homomorphic decryption on the encrypted statistical values and obtain the statistical values.

In one embodiment of the present specification, the apparatus may further comprise a data filtering module that is configured to obtain a plurality of pieces of first data of the local data statistics according to the predetermined data filtering conditions.

Figure 6:
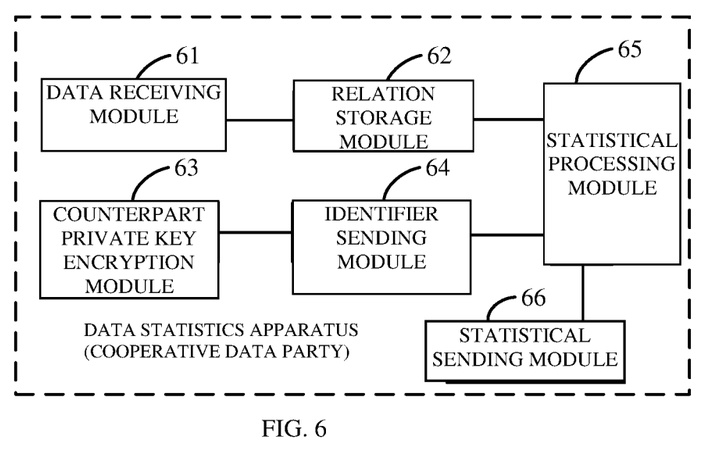
FIG. 6 is a block diagram of a data statistics apparatus according to one or more embodiments of the present specification.

To implement the method described above, one or more embodiments of the present specification may also provide a data statistics apparatus as shown in FIG. 6. The apparatus may comprise a data receiving module 61, a relation storage module 62, a counterpart private key encryption module 63, an identifier sending module 64, a statistical processing module 65, and a statistical sending module 66.

The data receiving module 61 is configured to receive a plurality of first processing identifiers and a plurality of pieces of encrypted data respectively corresponding to the plurality of first processing identifiers from the statistical data party. The first processing identifiers can be obtained by performing private key processing on the data identifiers of the plurality of pieces of first data subject to the data statistics according to a key exchange protocol by the statistical data party, and the encrypted data can be obtained by performing the homomorphic encryption on the plurality of pieces of first data by the statistical data party.

The relation storage module 62 is configured to perform counterpart private key processing on the various first processing identifiers according to the key exchange protocol, generate first key processing identifiers, and store the correlations between the first key processing identifiers and the corresponding encrypted data.

The counterpart private key encryption module 63 is configured to perform the counterpart private key processing on the data identifiers respectively corresponding to the plurality of pieces of second data subject to the data statistics according to the key exchange protocol, and obtain a plurality of second processing identifiers.

The identifier sending module 64 is configured to send the second processing identifiers to the statistical data party, and receive second key processing identifiers returned by the statistical data party. The second key processing identifiers can be obtained by performing the local private key processing on the second processing identifiers by the statistical data party.

The statistical processing module 65 is configured to obtain the various encrypted data corresponding to the identifier intersection between the first key processing identifiers and the second key processing identifiers, perform the statistical processing on the encrypted data corresponding to the identifier intersection, and obtain encrypted statistical values.

The statistical sending module 66 is configured to send the encrypted statistical values to the statistical data party, so that the statistical data party can perform the homomorphic decryption on the encrypted statistical values and obtain the statistical values.

For easy description of the apparatuses described above, various modules are respectively described according to functions thereof. Of course, the functions of the various modules can be implemented in one or more pieces of software and/or hardware when implementing the one or more embodiments of the present specification.

The various steps in the processes of the method are shown in the above embodiments of the present specification, and the execution sequence of the various steps may not be limited to the sequence shown in the flow charts. In addition, the various steps in the description may be implemented in a form of software, hardware, or combination thereof. For example, a person of ordinary skill in the art may implement the steps in a form of software codes, such as executable computer instructions of logic functions corresponding to the steps. When implemented in the form of software, the executable instructions can be stored in the memory and executed by the processor of the apparatus.

For example, corresponding to the methods described above, one or more embodiments of the present specification may provide a data statistics apparatus. The apparatus may comprise a processor, a memory, and computer instructions stored in the memory and executed on the processor. The processor may be configured to execute the instructions for implementing the steps comprising: respectively performing homomorphic encryption on the plurality of pieces of first data, and obtaining encrypted data; sending data identifiers corresponding to the plurality of pieces of first data and the encrypted data to a cooperative data party; receiving encrypted statistical values returned by the cooperative data party, wherein the encrypted statistical values are obtained by the cooperative data party by performing a statistical calculation on encrypted data corresponding to common data identifiers in an identifier intersection, the identifier intersection includes common identifiers corresponding to pieces of second data of cooperative data party subject to the data statistics and selected from the plurality of data identifiers corresponding to the plurality of pieces of first data; and performing homomorphic decryption on the encrypted statistical values and obtaining the statistical values.

The apparatus or modules described in the preceding embodiments may be specifically implemented by a computer chip or entity, or by a product with specific functions. A typical implementation apparatus may include a computing device such as a computer. The specific types of the computing device may include PCs, laptop computers, cell phones, camera phones, smart phones, personal digital assistants, media players, navigation apparatuses, email receiving and sending apparatuses, game consoles, tablet computers, wearable apparatuses, or a combination thereof.

A person of ordinary skill in the art should understand that one or more embodiments of the present specification may be provided as a method, an apparatus, a system, or a computer program product. Therefore, one or more embodiments of the present specification may adopt the hardware-only embodiments, software-only embodiments, or combination of software and hardware embodiments. In addition, one or more embodiments of the present specification may use the form of computer program products implemented in one or more available storage media (including but not limited to disk memories, CD-ROMs, and optical memories) containing executable computer program codes.

These computer program instructions may also be stored in a computer readable memory that can instruct computers or other programmable data processing apparatuses to operate in a particular way, so that instructions stored in the computer readable memory can generate products including an instruction apparatus. The instruction apparatus may implement any specific functions in one or more processes in the flow charts and/or in one or more blocks in the block diagram.

These computer program instructions may also be loaded to a computer or other programmable data processing equipment, so that a series of operating steps can be executed on the computer or other programmable equipment to generate processes implemented by the computer. Accordingly, the instructions executed in the computers or other programmable equipment may provide steps to implement any specific functions in one or more processes in the flow charts and/or in one or more blocks in the block diagram.

Noticeably, the terms "comprise", "include", and any other variants thereof cover a non-exclusive inclusion so that a process, method, commodity, or apparatus that comprises a series of elements comprises those elements and other elements that are not explicitly listed, or inherent elements of this process, method, commodity, or apparatus. In the absence of more restrictions, elements restricted by the sentence "comprise a . . . " do not exclude the existence of additional same elements comprised in the process, method, commodity, or apparatus.

One or more embodiments of the present specification may be described in the general context of executable computer instructions executed by a computer, such as a program module. A program module generally comprises routines, programs, objects, components, and data structures that perform specific tasks or implement specific types of abstract data. One or more embodiments of the present specification may also be implemented in distributed computing environments where tasks are performed by remote processing equipment connected through a communication network. In the distributed computing environments, the program modules may be located in local and remote computer storage media including memory devices.

Various embodiments of the present specification are described in a progressive manner, and the same and similar parts among the embodiments may be cross referenced. The differences of each embodiment from other embodiments are emphasized in the description. In particular, the embodiments of the server-side apparatus are briefly described, and they are basically similar to the embodiments of the method. The relevant elements may be referred to the description of the embodiments of the method.

Specific embodiments of the present specification are described above, and other embodiments are also within the scope of the attached claims. In some cases, the operations or steps recorded in the claims may be performed in a sequence different from the sequence in the embodiments and still achieve the expected results. In addition, the processes depicted in the figures do not necessarily require showing a specific or sequential sequence to achieve the expected results. In some embodiments, multitasking and parallel processing may also be possible or beneficial.

The foregoing description is only one or more preferred embodiments of the present specification and does not limit the present specification. Any modification, equivalent substitution, improvement, etc., made within the spirit and principles of the present specification shall be included in the protection scope of the present specification.

What is claimed is:

1. A data statistics method of protecting data privacy between respective different enterprises, comprising:
    combining data from a cooperative data party and a statistical data party, wherein the statistical data party has a plurality of pieces of first data for calculating statistical values, the plurality of pieces of first data respectively corresponds to data identifiers that are associated with a plurality of pieces of second data of the cooperative data party, and
    wherein combining data from a cooperative data party and a statistical data party comprises:
        receiving, by a first hardware processor of the cooperative data party, data identifiers corresponding to a portion of the plurality of pieces of first data for statistical processing of the combined data from the cooperative data party and the statistical data party based on filtering conditions designated by a portion of the plurality of pieces of second data and corresponding encrypted data obtained by performing homomorphic encryption on the portion of the plurality of pieces of first data from the statistical data party and subsequently generating, by the cooperative data party, counterpart security keys according to a key exchange protocol;
        determining, by the first hardware processor, an identifier intersection between data identifiers corresponding to the portion of the plurality of pieces of second data of the cooperative data party and the received data identifiers corresponding to the portion of the plurality of pieces of first data;
        performing, by the first hardware processor, the statistical processing on the received encrypted data corresponding to common data identifiers in the identifier intersection to obtain encrypted statistical values; and
        sending, by the first hardware processor, the encrypted statistical values to a second hardware processor of the statistical data party to enable the second hardware processor to perform decryption on the encrypted statistical values and obtain the statistical values.

2. The method according to claim 1,
    wherein receiving, by a first hardware processor of the cooperative data party, data identifiers corresponding to a portion of the plurality of pieces of first data for statistical processing of the combined data from the cooperative data party and the statistical data party based on filtering conditions designated by a portion of the plurality of pieces of second data and corresponding encrypted data obtained by performing homomorphic encryption on the portion of the plurality of pieces of first data from the statistical data party and subsequently generating, by the cooperative data party, counterpart security keys according to a key exchange protocol comprises receiving first processing identifiers from the statistical data party; and
    wherein after receiving the first processing identifiers from the statistical data party, the method further comprises operations performed by the first hardware processor:

generating first key processing identifiers by performing counterpart security key processing on the first processing identifiers using the counterpart security keys; and storing correlations between the first key processing identifiers and encrypted data thereof.

3. The method according to claim 2, further comprising operations performed by the first hardware processor:

performing the counterpart security key processing on the data identifiers respectively corresponding to the portion of the plurality of pieces of second data for the statistical processing using the counterpart security keys to obtain second processing identifiers, and sending the second processing identifiers to the statistical data party;

receiving second key processing identifiers returned by the statistical data party; and determining the identifier intersection between the first key processing identifiers and the second key processing identifiers.

4. The method according to claim 1, wherein:

when the statistical values comprise sums of the plurality of pieces of first data, performing, by the first hardware processor, the statistical processing on the received encrypted data corresponding to the common data identifiers in the identifier intersection to obtain encrypted statistical values comprises performing a summation statistical calculation on the received encrypted data; and when the statistical values comprise average values of the plurality of pieces of first data, performing, by the first hardware processor, the statistical processing on the received encrypted data corresponding to the common data identifiers in the identifier intersection to obtain encrypted statistical values comprises performing an average value calculation on the received encrypted data.

5. The method according to claim 1, wherein the encrypted statistical values is encrypted with homomorphic encryption, and the method further comprises operations performed by the second hardware processor of the statistical data party:

respectively performing the homomorphic encryption on the portion of the plurality of pieces of first data for the statistical processing to obtain the encrypted data;

sending the data identifiers corresponding to the portion of the plurality of pieces of first data and the corresponding encrypted data to the cooperative data party;

receiving the encrypted statistical values from the cooperative data party; and performing homomorphic decryption on the encrypted statistical values to obtain the statistical values.

6. The method according to claim 5, wherein sending the data identifiers corresponding to the portion of the plurality of pieces of first data and the corresponding encrypted data to the cooperative data party comprises the operations performed by the second hardware processor:

generating security keys according to the key exchange protocol;

performing security key processing on the data identifiers using the security keys to generate the first processing identifiers;

sending the first processing identifiers to the cooperative data party;

receiving the second processing identifiers from the cooperative data party;

performing the security key processing on the received second processing identifiers to generate the second key processing identifiers; and sending the second key processing identifiers to the cooperative data party.

7. The method according to claim 1, wherein the portion of the plurality of pieces of first data for the statistical processing based on the data filtering conditions is obtained by the second hardware processor.

8. A data statistics apparatus of protecting data privacy between respective different enterprises, comprising a memory, at least one hardware processor, and computer instructions stored in the memory and executable by the at least one hardware processor, to cause the at least one hardware processor to perform operations comprising:

combining data from a cooperative data party and a statistical data party, wherein the statistical data party has a plurality of pieces of first data for calculating statistical values, the plurality of pieces of first data respectively corresponds to data identifiers that are associated with a plurality of pieces of second data of the cooperative data party, and wherein combining data from the cooperative data party and the statistical data party comprises:

receiving, by a first hardware processor of the cooperative data party, data identifiers corresponding to a portion of the plurality of pieces of first data for statistical processing of the combined data from the cooperative data party and the statistical data party based on filtering conditions designated by a portion of the plurality of pieces of second data and corresponding encrypted data obtained by performing homomorphic encryption on the portion of the plurality of pieces of first data from a statistical data party and subsequently generating, by the cooperative data party, counterpart security keys according to a key exchange protocol, wherein the at least one hardware processor includes the first hardware processor and a second hardware processor of the statistical data party;

determining, by the first hardware processor, an identifier intersection between data identifiers corresponding to the portion of the plurality of pieces of second data of the cooperative data party and the received data identifiers corresponding to the portion of the plurality of pieces of first data;

performing, by the first hardware processor, the statistical processing on the received encrypted data corresponding to common data identifiers in the identifier intersection to obtain encrypted statistical values; and sending, by the first hardware processor, the encrypted statistical values to the second hardware processor of the statistical data party to enable the second hardware processor to perform decryption on the encrypted statistical values and obtain the statistical values.

9. The apparatus according to claim 8, wherein receiving, by a first hardware processor of the cooperative data party, data identifiers corresponding to a portion of the plurality of pieces of first data for statistical processing of the combined data from the cooperative data party and the statistical data party based on filtering conditions designated by a portion of the plurality of pieces of second data and corresponding encrypted data obtained by performing homomorphic encryption on the portion of the plurality of pieces of first data from the statistical data party and subsequently generating, by the cooperative data party, counterpart security keys according to a key exchange protocol comprises receiving first processing identifiers from the statistical data party; and wherein after the receiving the first processing identifiers from the statistical data party, the operations further comprise operations performed by the first hardware processor:

generating first key processing identifiers by performing counterpart security key processing on the first processing identifiers using the counterpart security keys; and storing correlations between the first key processing identifiers and encrypted data thereof.

10. The apparatus according to claim 8, wherein the operations further comprise operations performed by the first hardware processor:

performing the counterpart security key processing on the data identifiers respectively corresponding to the portion of the plurality of pieces of second data for the statistical processing using the counterpart security keys to obtain second processing identifiers, and sending the second processing identifiers to the statistical data party;

receiving second key processing identifiers returned by the statistical data party; and determining the identifier intersection between the first key processing identifiers and the second key processing identifiers.

11. The apparatus according to claim 8, wherein when the statistical values comprise sums of the plurality of pieces of first data, performing, by the first hardware processor, the statistical processing on the received encrypted data corresponding to the common data identifiers in the identifier intersection to obtain encrypted statistical values comprises performing a summation statistical calculation on the received encrypted data; and when the statistical values comprise average values of the plurality of pieces of first data, performing, by the first hardware processor, the statistical processing on the received encrypted data corresponding to the common data identifiers in the identifier intersection to obtain encrypted statistical values comprises performing an average value calculation on the received encrypted data.

12. The apparatus according to claim 8, wherein the encrypted statistical values is encrypted with homomorphic encryption, and the operations further comprise operations performed by the second hardware processor:

respectively performing the homomorphic encryption on the portion of the plurality of pieces of first data for the statistical processing to obtain the encrypted data;

sending the data identifiers corresponding to the portion of the plurality of pieces of first data and the corresponding encrypted data to the cooperative data party;

receiving the encrypted statistical values from the cooperative data party; and performing homomorphic decryption on the encrypted statistical values to obtain the statistical values.

13. The apparatus according to claim 12, wherein sending the data identifiers corresponding to the pieces of first data and the corresponding encrypted data to the cooperative data party comprises operations performed by the second hardware processor:

generating security keys according to the key exchange protocol;

performing security key processing on the data identifiers using the security keys to generate the first processing identifiers;

sending the first processing identifiers to the cooperative data party;

receiving the second processing identifiers from the cooperative data party;

performing the security key processing on the received second processing identifiers to generate the second key processing identifiers; and sending the second key processing identifiers to the cooperative data party.

14. The apparatus according to claim 8, wherein the portion of the plurality of pieces of first data for the statistical processing based on the data filtering conditions is obtained by the second hardware processor.

15. A non-transitory computer-readable storage medium, comprising at least a computer instructions stored in a memory and executed by at least one hardware processor, to cause the at least one hardware processor to perform data statistics operations of protecting data privacy between respective different enterprises comprising:

combining data from a cooperative data party and a statistical data party, wherein the statistical data party has a plurality of pieces of first data for calculating statistical values, the plurality of pieces of first data respectively corresponds to data identifiers that are associated with a plurality of pieces of second data of the cooperative data party, and wherein combining data from the cooperative data party and the statistical data party comprises:

receiving, by a first hardware processor of the cooperative data party, data identifiers corresponding to a portion of the plurality of pieces of first data for statistical processing of the combined data from the cooperative data party and the statistical data party based on filtering conditions designated by a portion of the plurality of pieces of second data and corresponding encrypted data obtained by performing homomorphic encryption on the portion of the plurality of pieces of first data from a statistical data party and subsequently generating, by the cooperative data party, counterpart security keys according to a key exchange protocol, wherein the at least one hardware processor includes the first hardware processor and a second hardware processor of the statistical data party;

determining, by the first hardware processor, an identifier intersection between data identifiers corresponding to the portion of the plurality of pieces of second data of the cooperative data party and the received data identifiers corresponding to the portion of the plurality of pieces of first data;

performing, by the first hardware processor, the statistical processing on the received encrypted data corresponding to common data identifiers in the identifier intersection to obtain encrypted statistical values; and sending, by the first hardware processor, the encrypted statistical values to the second hardware processor of the statistical data party to enable the second hardware processor to perform decryption on the encrypted statistical values and obtain the statistical values.

16. The medium according to claim 15, wherein receiving, by a first hardware processor of the cooperative data party, data identifiers corresponding to a portion of the plurality of pieces of first data for statistical processing of the combined data from the cooperative data party and the statistical data party based on filtering conditions designated by a portion of the plurality of pieces of second data and corresponding encrypted data obtained by performing homomorphic encryption on the portion of the plurality of pieces of first data from the statistical data party and subsequently generating, by the cooperative data party, counterpart security keys according to a key exchange protocol comprises receiving first processing identifiers from the statistical data party; and wherein after receiving the first processing identifiers from the statistical data party, the operations further comprise operations performed by the first hardware processor:

generating first key processing identifiers by performing counterpart security key processing on the first processing identifiers using the counterpart security keys; and storing correlations between the first key processing identifiers and encrypted data thereof; and wherein the operations further comprise operations performed by the first hardware processor:

performing the counterpart security key processing on the data identifiers respectively corresponding to the portion of the plurality of pieces of second data for the statistical processing using the counterpart security keys to obtain second processing identifiers, and sending the second processing identifiers to the statistical data party;

receiving second key processing identifiers returned by the statistical data party; and determining the identifier intersection between the first key processing identifiers and the second key processing identifiers.

17. The medium according to claim 15, when the statistical values comprise sums of the plurality of pieces of first data, performing, by the first hardware processor, the statistical processing on the received encrypted data corresponding to the common data identifiers in the identifier intersection to obtain encrypted statistical values comprises performing a summation statistical calculation on the received encrypted data; and when the statistical values comprise average values of the plurality of pieces of first data, performing, by the first hardware processor, the statistical processing on the received encrypted data corresponding to the common data identifiers in the identifier intersection to obtain encrypted statistical values comprises performing an average value calculation on the received encrypted data.

18. The apparatus according to claim 15, wherein the encrypted statistical values is encrypted with homomorphic encryption, and the operations further comprise operations performed by the second hardware processor:

respectively performing the homomorphic encryption on the portion of the plurality of pieces of first data for the statistical processing to obtain the encrypted data;

sending the data identifiers corresponding to the portion of the plurality of pieces of first data and the corresponding encrypted data to the cooperative data party;

receiving the encrypted statistical values from the cooperative data party; and performing homomorphic decryption on the encrypted statistical values to obtain the statistical values.

19. The apparatus according to claim 18, wherein sending the data identifiers corresponding to the pieces of first data and the corresponding encrypted data to the cooperative data party comprises operations performed by the second hardware processor:

generating security keys according to the key exchange protocol;

performing security key processing on the data identifiers using the security keys to generate the first processing identifiers;

sending the first processing identifiers to the cooperative data party;

receiving the second processing identifiers from the cooperative data party;

performing the security key processing on the received second processing identifiers to generate the second key processing identifiers; and sending the second key processing identifiers to the cooperative data party.

20. The apparatus according to claim 15, wherein the portion of the plurality of pieces of first data for the statistical processing based on the data filtering conditions is obtained by the second hardware processor.

* * * * *